US009703089B2

(12) United States Patent
Harada et al.

(10) Patent No.: US 9,703,089 B2
(45) Date of Patent: Jul. 11, 2017

(54) OBJECTIVE LENS FOR ENDOSCOPES AND ENDOSCOPE

(71) Applicant: FUJIFILM Corporation, Tokyo (JP)

(72) Inventors: Keisuke Harada, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 63 days.

(21) Appl. No.: 14/965,025

(22) Filed: Dec. 10, 2015

(65) Prior Publication Data

US 2016/0178885 A1 Jun. 23, 2016

(30) Foreign Application Priority Data

Dec. 17, 2014 (JP) ................. 2014-254809

(51) Int. Cl.
G02B 21/02 (2006.01)
G02B 23/24 (2006.01)
G02B 27/00 (2006.01)

(52) U.S. Cl.
CPC ....... G02B 23/243 (2013.01); G02B 27/0025 (2013.01)

(58) Field of Classification Search
CPC ........ G02B 13/04; G02B 13/06; G02B 13/18; G02B 9/34; G02B 9/12; G02B 21/02
USPC ................. 359/656–660, 695, 713, 761–762
See application file for complete search history.

(56) References Cited

U.S. PATENT DOCUMENTS 6,327,101 B1 12/2001 Miyano
2008/0249367 A1* 10/2008 Miyano ................ G02B 23/243
600/168

FOREIGN PATENT DOCUMENTS

JP 2000-330015 A 11/2000
JP 2011-227380 A 11/2011

* cited by examiner

*Primary Examiner* — Scott J Sugarman
*Assistant Examiner* — Vipin Patel
(74) *Attorney, Agent, or Firm* — Studebaker & Brackett PC

(57) ABSTRACT

An objective lens for endoscopes is constituted essentially by, in order from the object side: a negative first lens having a concave surface toward the image side; a first cemented lens, formed by cementing a second lens and a third lens having refractive powers with signs opposite each other, provided in this order from the object side, together; a stop; a positive fourth lens having a convex surface toward the image side; and a second cemented lens, formed by cementing a positive fifth lens and a negative sixth lens, provided in this order from the object side, together, in which the coupling surface is convex toward the image side. Focusing from an object at a most distant point to an object at a most proximal point is performed by moving only the second cemented lens. A predetermined conditional formula is satisfied.

20 Claims, 14 Drawing Sheets

FIG.1
EXAMPLE 1
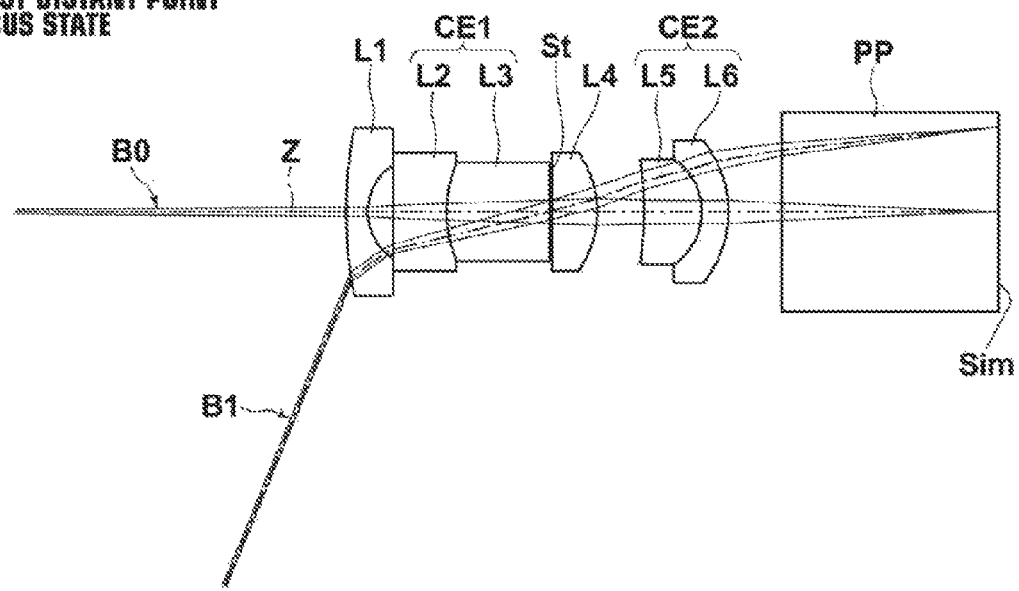
MOST DISTANT POINT FOCUS STATE
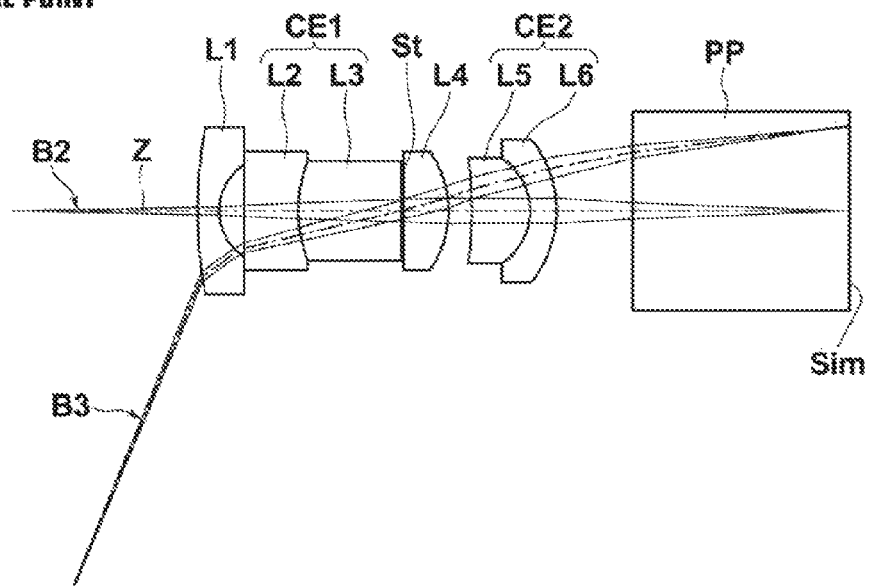
MOST PROXIMAL POINT FOCUS STATE

FIG.2
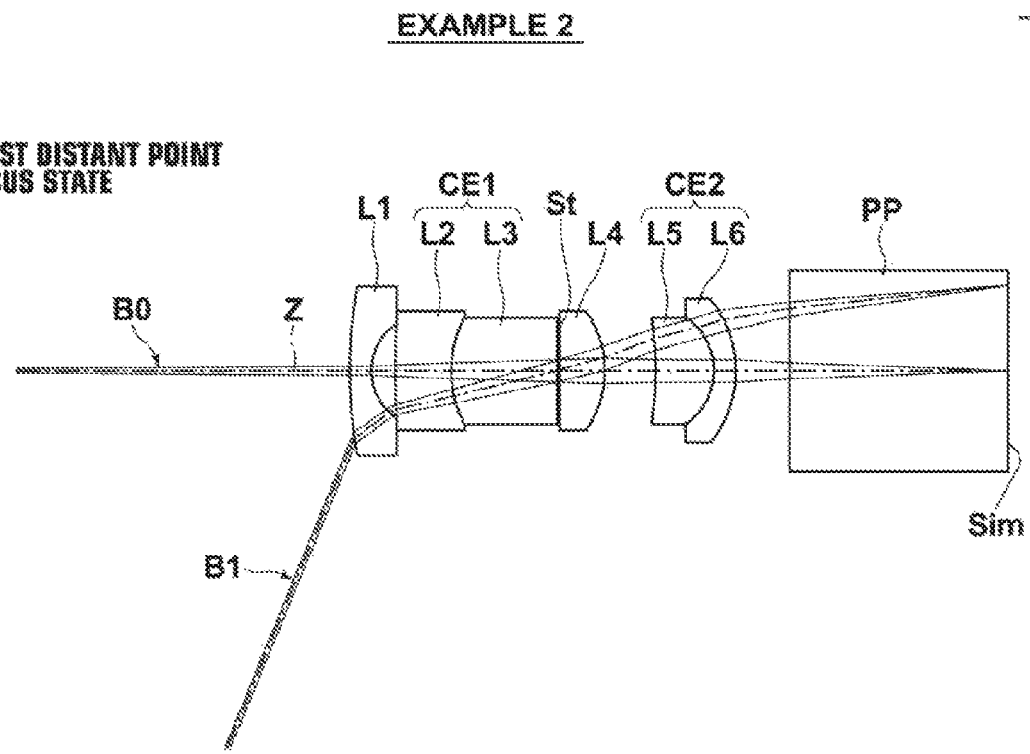
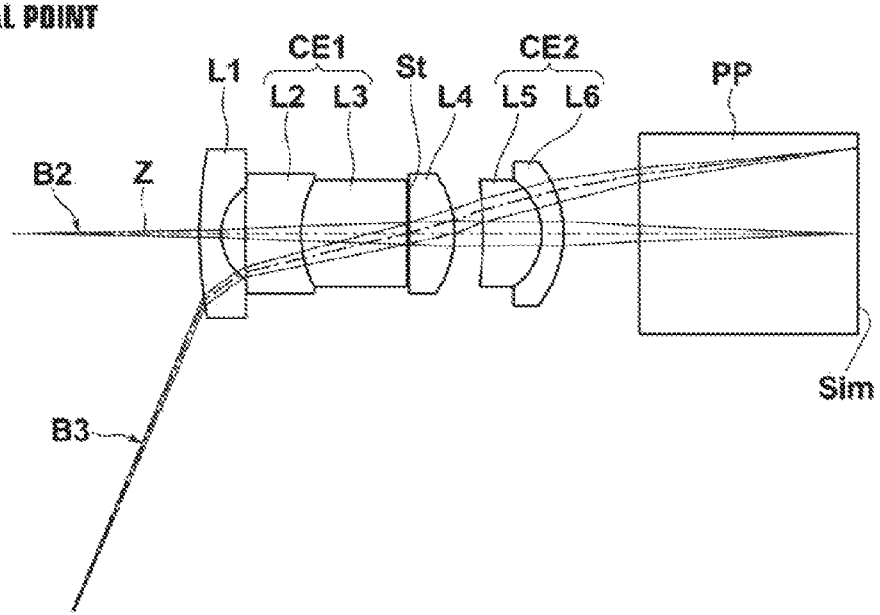

FIG.3
EXAMPLE 3
MOST DISTANT POINT FOCUS STATE
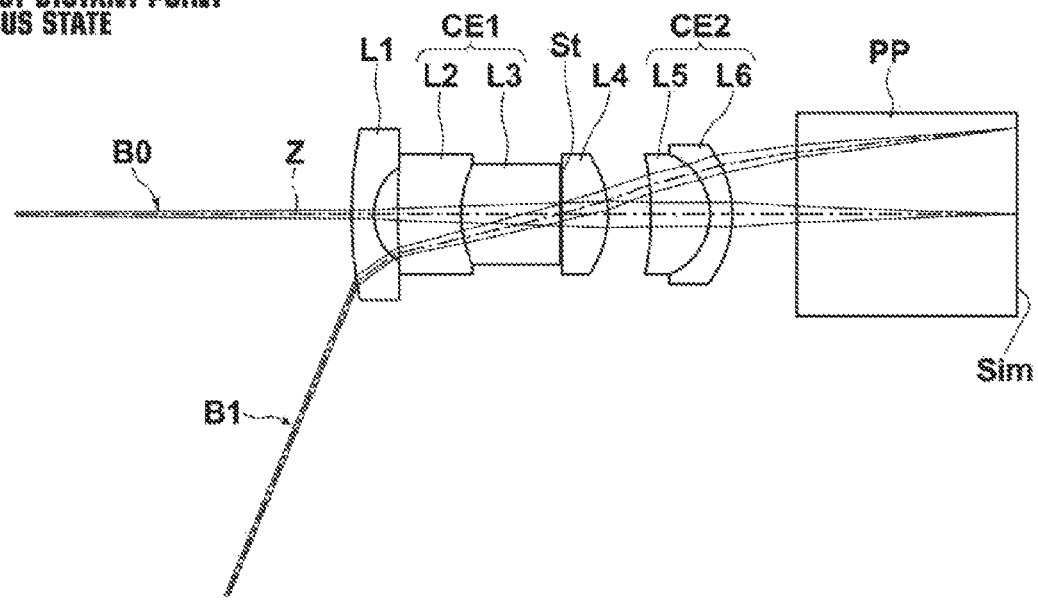
MOST PROXIMAL POINT FOCUS STATE
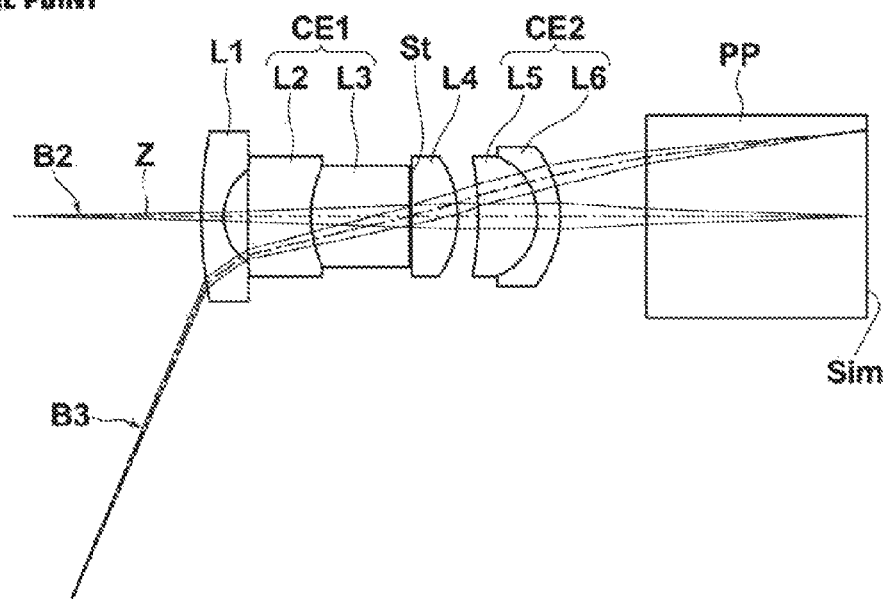

FIG.4
EXAMPLE 4
MOST DISTANT POINT FOCUS STATE
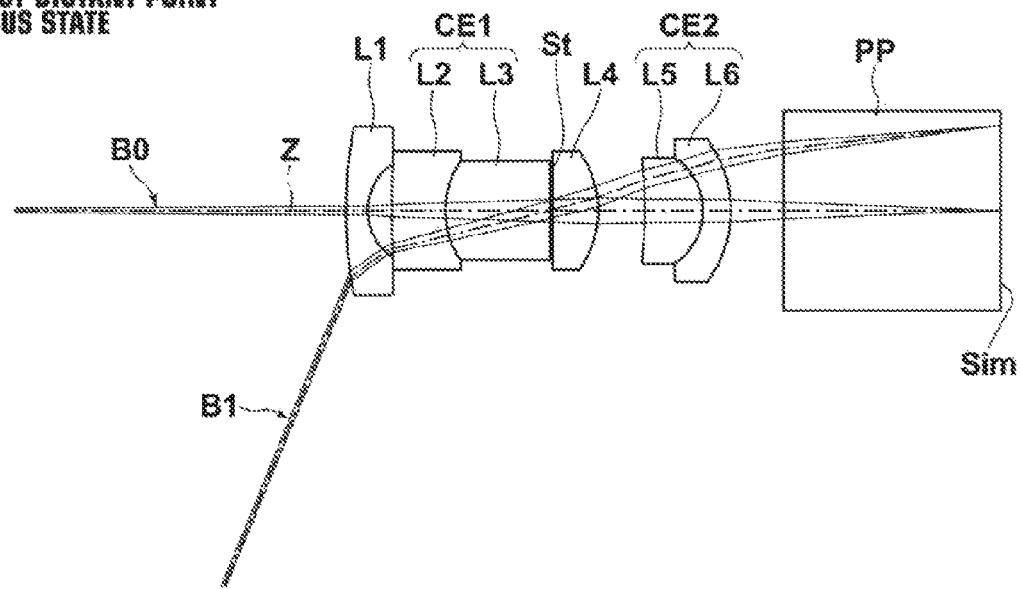
MOST PROXIMAL POINT FOCUS STATE
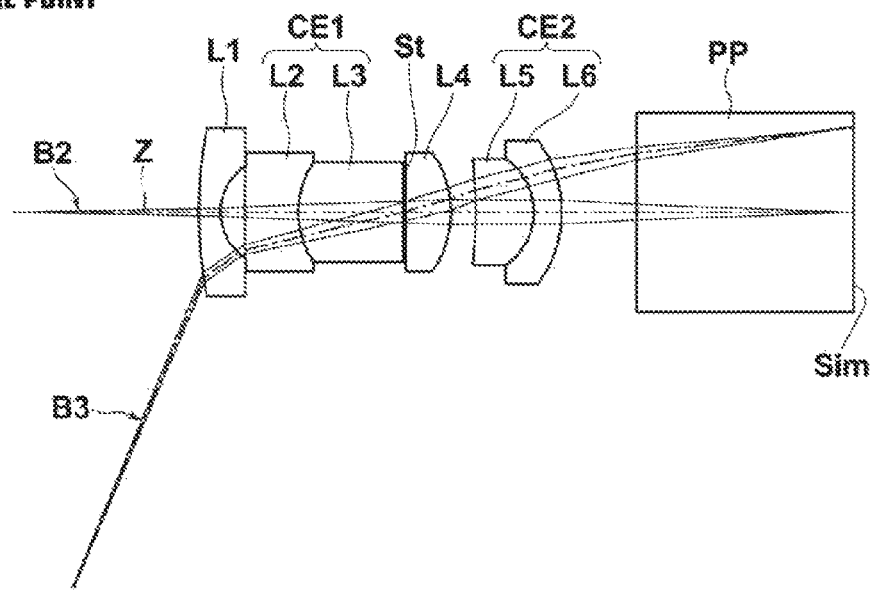

FIG.5
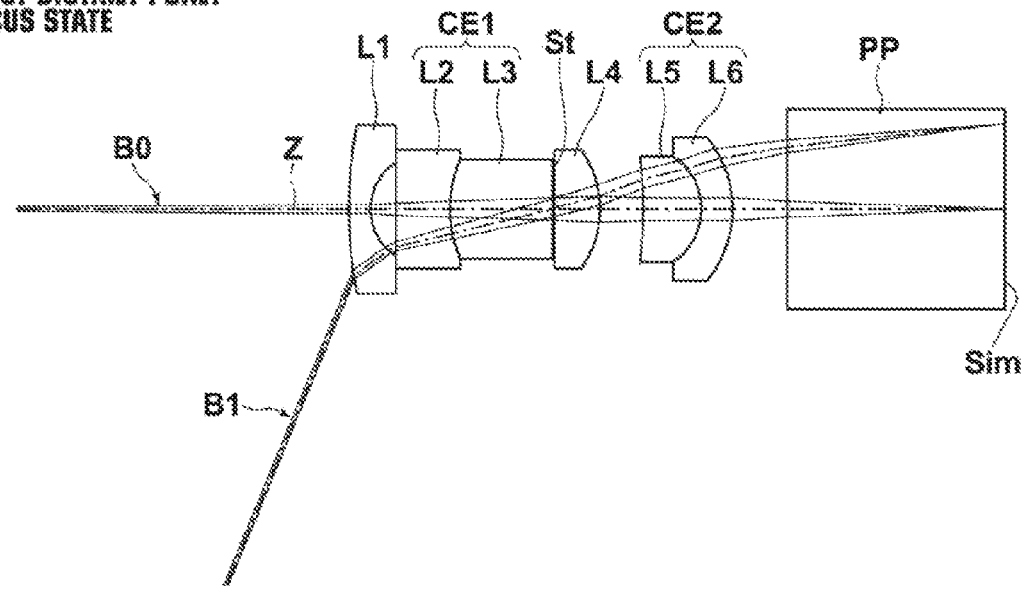
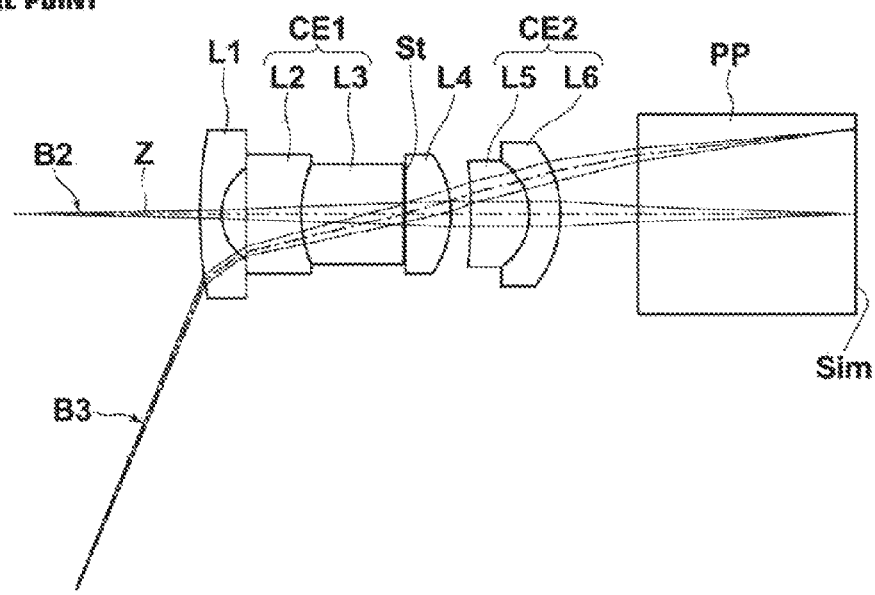

FIG.6
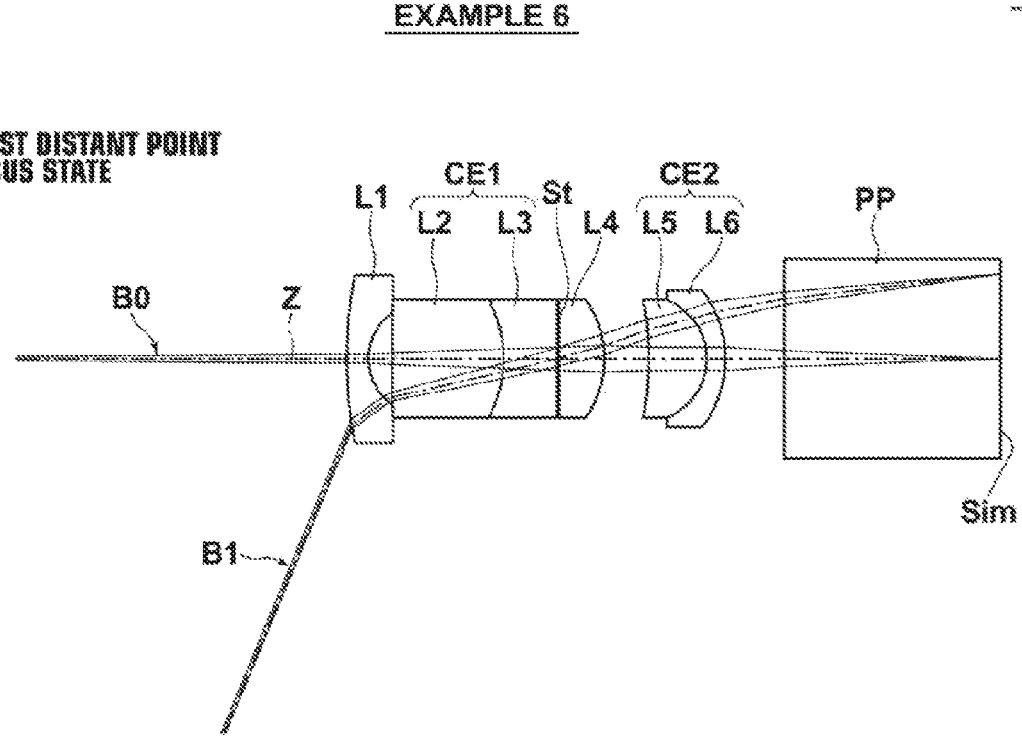
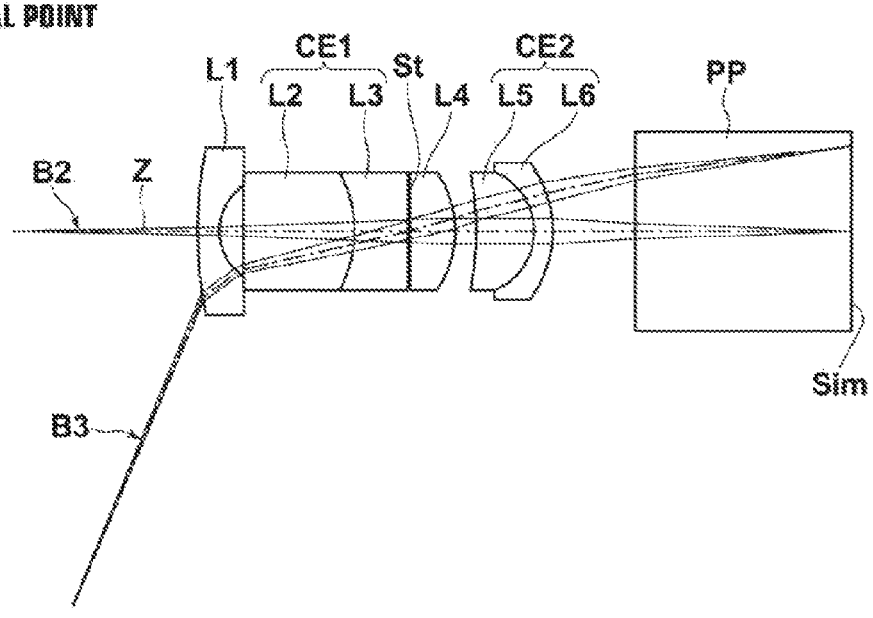

FIG.9 EXAMPLE 3

EXAMPLE 5

OBJECTIVE LENS FOR ENDOSCOPES AND ENDOSCOPE

CROSS REFERENCE TO RELATED APPLICATIONS

The present application claims priority under 35 U.S.C. §119 to Japanese Patent Application No. 2014-254809 filed on Dec. 17, 2014. The above application is hereby expressly incorporated by reference, in its entirety, into the present application

BACKGROUND

The present disclosure is related to an objective lens for endoscopes and to an endoscope equipped with the objective lens for endoscopes.

Conventionally, there is demand for high quality images to be obtained at deep observation depths, in the field of endoscopic observation. Objective lenses for endoscopes in which focus adjustment is possible have been proposed in order to meet this demand. For example, Japanese Unexamined Patent Publication No. 2000-330015 discloses an objective lens for endoscopes constituted by two lens groups, in which a lens group toward the image side moves toward the image side and toward the object side to focus on distant objects and close objects, respectively.

Meanwhile, recently, images which are obtained by endoscopes are converted into electrical signals and image processes are administered thereon, in order to observe blood vessels, surface structures, and the like. There are cases in which a short wavelength laser beam is employed as a light source in addition to a white light source. Objective lenses for endoscopes which are compatible with such light sources have also been proposed. For example, Japanese Unexamined Patent Publication No. 2011-227380 discloses an objective lens for endoscopes, in which aberrations are favorably corrected throughout a wide wavelength range from a short wavelength band that includes a wavelength of approximately 405 nm to a visible wavelength band.

SUMMARY

In addition to the matters above, wide field of view observation is desired for endoscopic observation. Therefore, there is a tendency for objective lenses for endoscopes to have wide angles of view. However, a further widening of the angle of view is desired for the objective lens for endoscopes disclosed in Japanese Unexamined Patent Publication No. 2000-330015 in order to be compatible with recent demand for wide field of view observation. Generally, lateral chromatic aberration becomes greater as the angle of view becomes wider. Taking the increased number of pixels in recent electronic endoscopes and recent desire for highly accurate observations into consideration, favorable correction of lateral chromatic aberration is important along with a widening of the angle of view.

The objective lens for endoscopes disclosed in Japanese Unexamined Patent Publication No. 2011-227380 favorably corrects chromatic aberration across a wide wavelength range. However, Japanese Unexamined Patent Publication No. 2011-227380 is silent regarding switching from focus on an object at a far distance to focus on an object at a close distance. Assuming that focusing operations are performed by moving the cemented lens provided most toward the image side in the objective lens for endoscopes disclosed in Japanese Unexamined Patent Publication No. 2011-227380, it is expected that fluctuations in astigmatism and lateral chromatic aberration will increase.

The present disclosure has been developed in view of the foregoing circumstances. The present disclosure provides an objective lens for endoscopes which is capable of switching from focus on an object at a far distance to focus on an object at a close distance, has a wide angle of view, favorably corrects various aberrations including lateral chromatic aberration, and is capable of maintaining high resolution. The present disclosure also provides an endoscope equipped with this objective lens for endoscopes.

The objective lens for endoscopes of the present disclosure consists essentially of in order from the object side to the image side:

a first lens having a negative refractive power and a concave surface toward the image side;

a first cemented lens, formed by cementing a second lens and a third lens having refractive powers with signs opposite each other, provided in this order from the object side to the image side, together, a stop;

a fourth lens having a positive refractive power and a convex surface toward the image side; and a second cemented lens, formed by cementing a fifth lens having a positive refractive power and a sixth lens having a negative refractive power, provided in this order from the object side to the image side, together, in which the coupling surface between the fifth lens and the sixth lens is convex toward the image side;

focusing operations to change focus from an object at a most distant point to an object at a most proximal point being performed by moving only the second cemented lens; and Conditional Formula (1) below being satisfied:

$$0.3 < (L5f - L6r)/(L5f + L6r) < 0.8 \qquad (1)$$

wherein L5f is the radius of curvature of the surface of the fifth lens toward the object side, and L6r is the radius of curvature of the surface of the sixth lens toward the image side.

The first cemented lens may be formed by cementing a second lens having a negative refractive power and a third lens having a positive refractive power, provided in this order from the object side to the image side, together, and the coupling surface may be convex toward the object side. Alternatively, the first cemented lens may be formed by cementing a second lens having a positive refractive power and a third lens having a negative refractive power, provided in this order from the object side to the image side, together, and the coupling surface may be convex toward the image side.

In the objective lens for endoscopes of the present disclosure, it is preferable for any one or arbitrary combinations of Conditional Formulae (2) through (9), (1-1) through (5-1), and (7-1) through (9-1) to be satisfied.

$$2 < \nu 1Cn - \nu 1Cp < 10 \qquad (2)$$

$$25 < \nu 2Cp - \nu 2Cn < 60 \qquad (3)$$

$$0.01 < \theta gF1Cp - \theta gF1Cn < 0.04 \qquad (4)$$

$$0.04 < \theta gF2Cn - \theta gF2Cp < 0.09 \qquad (5)$$

$$0.15 < f/fC2 < 0.4 \qquad (6)$$

$$0 < f/fC1 < 0.3 \qquad (7)$$

$$0.02 < \theta hg2Cn - \theta hg2Cp < 0.15 \qquad (8)$$

$$0 < \theta hg1Cp - \theta hg1Cn < 0.07 \quad (9)$$

$$0.4 < (L5f - L6r)/(L5f + L6r) < 0.7 \quad (1\text{-}1)$$

$$3 < \nu1Cn - \nu1Cp < 8 \quad (2\text{-}1)$$

$$30 < \nu2Cp - \nu2Cn < 50 \quad (3\text{-}1)$$

$$0.015 < \theta gF1Cp - \theta gF1Cn < 0.035 \quad (4\text{-}1)$$

$$0.05 < \theta gF2Cn - \theta gF2Cp < 0.08 \quad (5\text{-}1)$$

$$0.05 < f/fC1 < 0.1 \quad (7\text{-}1)$$

$$0.06 < \theta hg2Cn - \theta hg2Cp < 0.12 \quad (8\text{-}1)$$

$$0.02 < \theta hg1Cp - \theta hg1Cn < 0.06 \quad (9\text{-}1)$$

wherein L5f is the radius of curvature of the surface of the fifth lens toward the object side, L6r is the radius of curvature of the surface of the sixth lens toward the image side, $\nu1Cp$ is the Abbe's number with respect to the d line of the positive lens within the first cemented lens, $\nu1Cn$ is the Abbe's number with respect to the d line of the negative lens within the first cemented lens, $\nu2Cp$ is the Abbe's number with respect to the d line of the positive lens within the second cemented lens, $\nu2Cn$ is the Abbe's number with respect to the d line of the negative lens within the second cemented lens, $\theta gF1Cp$ is the partial dispersion ratio between the g line and the F line of the positive lens within the first cemented lens, $\theta gF1Cn$ is the partial dispersion ratio between the g line and the F line of the negative lens within the first cemented lens, $\theta gF2Cp$ is the partial dispersion ratio between the g line and the F line of the positive lens within the second cemented lens, $\theta gF2Cn$ is the partial dispersion ratio between the g line and the F line of the negative lens within the second cemented lens, $\theta hg2Cp$ is the partial dispersion ratio between the h line and the g line of the positive lens within the second cemented lens, $\theta hg2Cn$ is the partial dispersion ratio between the h line and the g line of the negative lens within the second cemented lens, $\theta hg1Cp$ is the partial dispersion ratio between the h line and the g line of the positive lens within the first cemented lens, $\theta hg1Cn$ is the partial dispersion ratio between the h line and the g line of the negative lens within the first cemented lens, f is the focal length of the entire lens system, fC1 is the focal length of the first cemented lens, and fC2 is the focal length of the second cemented lens.

Note that the focal lengths which are employed in the above conditional formulae are those related to the d line, and f above is the focal length when the objective lens is focused on an object at a most distant point. In addition, the partial dispersion ratio $\theta gF$ of a lens between the g line and the F line is defined as $\theta gF = (Ng - NF)/(NF - NC)$ and the partial dispersion ratio $\theta hg$ of a lens between the h line and the g line is defined as $\theta hg = (Nh - Ng)/(NF - NC)$, wherein Nh, Ng, NF, and NC are the refractive indices of the lens with respect to the h line (wavelength: 404.7 nm), the g line (wavelength: 435.8 nm), the F line (wavelength: 486.1 nm), and the C line (wavelength: 656.3 nm), respectively.

Note that the term "essentially" in the above expression "consists essentially of . . . " means that the objective lens may also include lenses that practically do not have any power, optical elements other than lenses such as an aperture stop and a cover glass, and mechanical components such as lens flanges, a lens barrel, etc., in addition to the constituent elements listed above.

Note that the symbols of the refractive powers and the surface shapes of the lenses above are those in the paraxial region for lenses that include aspherical surfaces. In addition, the signs of the radii of curvature are positive for shapes which are convex toward the object side, and negative for shapes which are convex toward the image side.

An endoscope of the present disclosure is characterized by being equipped with the objective lens for endoscopes of the present disclosure.

In the objective lens for endoscopes of the present disclosure, the configuration of each lens is favorably set, and particularly, a cemented lens constituted by a positive and a negative lens is provided both at the object side and the image side of the stop. Focusing operations are performed by moving the cemented lens most toward the image side, and a predetermined conditional formula is satisfied. Therefore, a lens system which is capable of switching from focus on an object at a far distance to focus on an object at a close distance, has a wide angle of view, favorably corrects various aberrations including lateral chromatic aberration, and is capable of maintaining high resolution can be realized.

The endoscope of the present disclosure is equipped with the objective lens for endoscopes of the present disclosure. Therefore, the endoscope of the present disclosure is capable of observation at a deep observation depth and a wide field of view, and can obtain favorable images.

BRIEF DESCRIPTION OF THE DRAWINGS

FIG. 1 that illustrates an example of the configuration of an objective lens for endoscopes according to an embodiment of the present disclosure, and is a collection of cross sectional diagrams that illustrate the configuration of an objective lens for endoscopes of Example 1 and the paths of light rays that pass therethrough.

FIG. 2 is a collection of cross sectional diagrams that illustrate the configuration of an objective lens for endoscopes of Example 2 and the paths of light rays that pass therethrough.

FIG. 3 is a collection of cross sectional diagrams that illustrate the configuration of an objective lens for endoscopes of Example 3 and the paths of light rays that pass therethrough.

FIG. 4 is a collection of cross sectional diagrams that illustrate the configuration of an objective lens for endoscopes of Example 4 and the paths of light rays that pass therethrough.

FIG. 5 is a collection of cross sectional diagrams that illustrate the configuration of an objective lens for endoscopes of Example 5 and the paths of light rays that pass therethrough.

FIG. 6 is a collection of cross sectional diagrams that illustrate the configuration of an objective lens for endoscopes of Example 6 and the paths of light rays that pass therethrough.

DETAILED DESCRIPTION OF THE PREFERRED EMBODIMENTS

Figure 7:
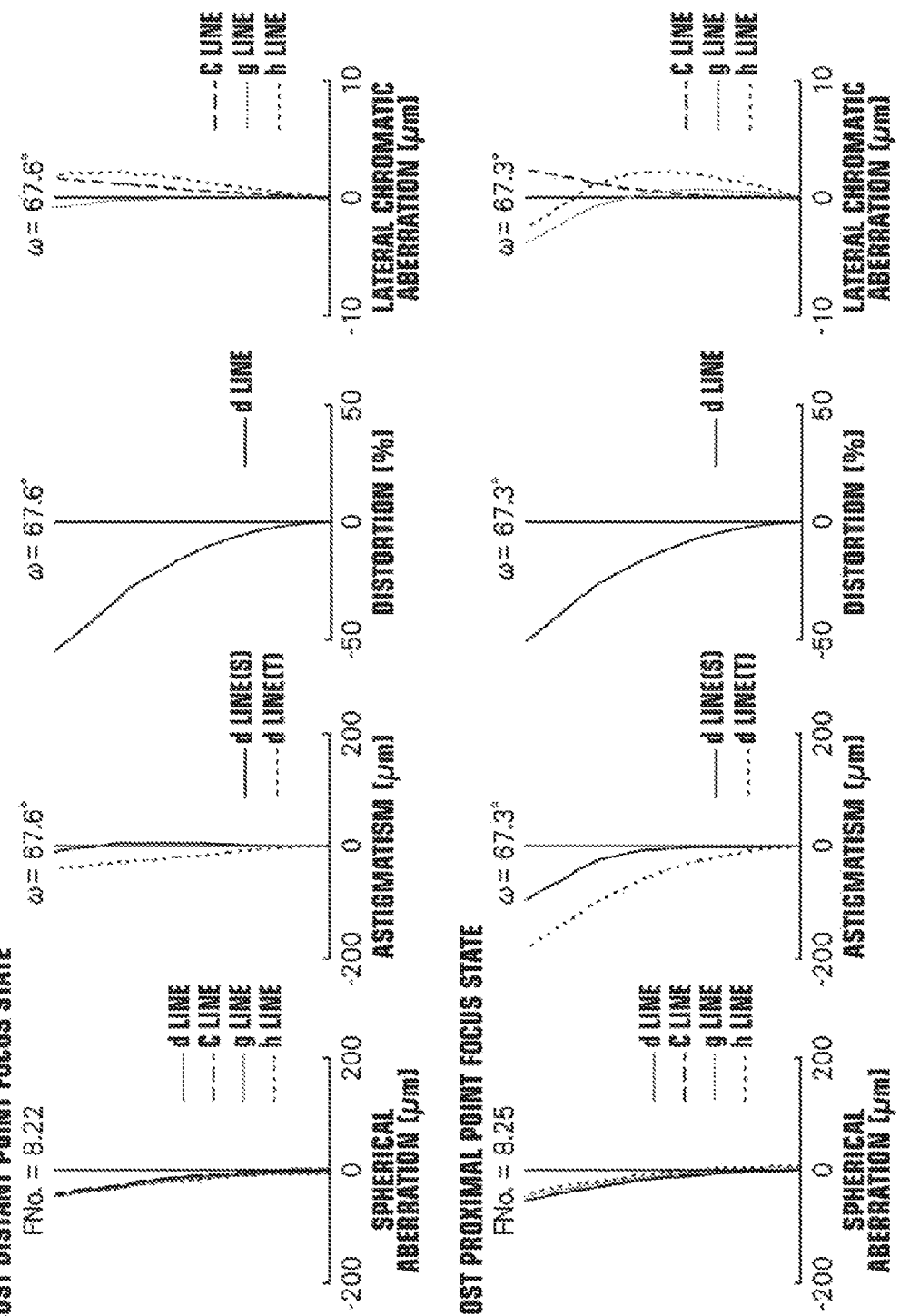
FIG. 7 is a collection of diagrams that illustrate various aberrations of the objective lens for endoscopes of Example 1, which are spherical aberration, astigmatism, distortion, and lateral chromatic aberration in this order from the left side of the drawing sheet.

Hereinafter, embodiments of the present disclosure will be described in detail with reference to the attached drawings. FIG. 1 illustrates the cross sectional configuration of an objective lens for endoscopes according to an embodiment of the present disclosure that includes the optical axis Z thereof. The example of the configuration illustrated in FIG. 1 corresponds to the configuration of a lens of Example 1 to be described later. In FIG. 1, the left side is the object side, and the right side is the image side. The upper portion of FIG. 1 illustrates a most distant point focus state in which the objective lens is focused on an object at a most distant point, and the lower portion of FIG. 1 illustrates a most proximal point focus state in which the objective lens is focused on an object at a most proximal point. Note that the object distances of the object at the most distant point and the object at the most proximal point may be determined by taking the depth of field at each object distance into consideration. In this example, the object distances of the object at the most distant point and the object at the most proximal point are 12 mm and 3 mm, respectively. FIG. 1 also illustrates the paths of an axial light beam B0 and an off axis light beam B1 at the maximum angle of view in the most distant point focus state, and the paths of an axial light beam B2 and an off axis light beam B3 at the maximum angle of view in the most proximal point focus state.

This objective lens for endoscopes is constituted essentially by, along the optical axis Z in order from the object side to the image side: a first lens L1 having a negative refractive power and a concave surface toward the image side; a first cemented lens CE1, formed by cementing a second lens L2 and a third lens L3 having refractive powers with signs opposite each other, provided in this order from the object side to the image side, together; an aperture stop St; a fourth lens L4 having a positive refractive power and a convex surface toward the image side; and a second cemented lens CE2, formed by cementing a fifth lens L5 having a positive refractive power and a sixth lens L6 having a negative refractive power, provided in this order from the object side to the image side, together, of which the coupling surface between the fifth lens L5 and the sixth lens L6 is convex toward the image side. In addition, the objective lens is configured such that focusing operations to change focus from an object at a most distant point to an object at a most proximal point are performed by moving only the second cemented lens CE2.

Note that FIG. 1 illustrates an example in which a plate shaped optical member PP, of which a light entry surface and a light exit surface are parallel, is provided at the image side of the second cemented lens CE2. However, it is possible for the objective lens for endoscopes of the present disclosure to be of a configuration from which the optical member PP is omitted. The optical member PP presumes the presence of an optical path converting prism for bending optical paths, filters, a cover glass, etc. In the case that an optical path converting prism is employed, the optical paths will be bent. However, FIG. 1 illustrates an example in which the optical paths are not bent, in order to facilitate understanding. Note that FIG. 1 illustrates an example in which the surface of the optical member PP toward the image side is positioned at an imaging surface Sim. However, the present disclosure is not limited to such a configuration.

In this objective lens for endoscopes, the incident angles of off axis light rays with respect to the second lens L2 and lenses more toward the image side than the second lens L2 can be decreased, by configuring the first lens L1 to be a negative lens, which is advantageous from the viewpoint of widening the angle of view. In addition, negative refractive power can be imparted to the first lens L1 while suppressing the generation of astigmatism, by the surface of the first lens L1 toward the image side being concave.

One of the second lens L2 and the third lens L3 that constitute the first cemented lens CE1 is a positive lens, and the other is a negative lens. Employing a cemented lens formed by cementing a positive lens and a negative lens together is advantageous from the viewpoint of correcting lateral chromatic aberration.

The first cemented lens CE1 mat be formed by cementing a second lens L2 having a negative refractive power and a third lens L3 having a positive refractive power, provided in this order from the object side to the image side, together. In this case, lateral chromatic aberration being excessively corrected at the peripheral portions of an imaging region can be prevented if the coupling surface between the second lens L2 and the third lens L3 is convex toward the object side.

The first cemented lens CE1 mat be formed by cementing a second lens L2 having a positive refractive power and a third lens L3 having a negative refractive power, provided in this order from the object side to the image side, together. In this case, forming the coupling surface between the second lens L2 and the third lens L3 to be convex toward the image side is advantageous from the viewpoint of correcting longitudinal chromatic aberration.

Light that propagates from the object side to the image side and is spread by the first lens L1 can be caused to become weakly diverging light or converging light, by configuring the fourth lens L4 to be a positive lens. Thereby, the imaging magnification of the second cemented lens CE2 can be prevented from being in the vicinity of 1× magnification, and the amount of movement of the second cemented lens CE2 when changing focus from an object at a most distant point to an object at a most proximal point can be decreased. In addition, the generation of astigmatism can be suppressed, by the surface toward the image side of the fourth lens L4 being convex.

With respect to the second cemented lens CE2, longitudinal chromatic aberration and lateral chromatic aberration generated at the first lens L1 can be corrected, by cementing a positive lens and a negative lens, provided in this order from the object side to the image side, together. Lateral chromatic aberration being excessively corrected at the peripheral portions of an imaging region can be prevented by the coupling surface of the second cemented lens CE2 being convex toward the image side.

It is preferable for the second cemented lens CE2 to have a positive refractive power as a whole. In addition, the second cemented lens CE2 may be of a meniscus shape having a concave surface toward the object side as a whole. In this case, the amount of aberration which is generated can be suppressed. In addition, fluctuations in astigmatism and lateral chromatic aberration due to focusing operations can also be suppressed.

The objective lens for endoscopes is of a configuration capable of switching focus, by moving the second cemented lens CE2 to change focus from an object at a most distant point to an object at a most proximal point. As a result, the observation distance can be switched, and it becomes possible to deepen the observation depth. That is, it will become possible for the total observation depth that includes the depths of field of both an object at a most proximal point and an object at a most distant point to become deeper. Note that it is preferable for the second cemented lens CE2 to move such that it is positioned more toward the object side in the most proximal point focus state than in the most distant point focus state.

In addition, this objective lens for endoscopes is configured such that Conditional Formula (1) below is satisfied.

$$0.3<(L5f-L6r)/(L5f+L6r)<0.8 \quad (1)$$

wherein L5f is the radius of curvature of the surface of the fifth lens toward the object side, and L6r is the radius of curvature of the surface of the sixth lens toward the image side.

The generation of spherical aberration can be suppressed, by configuring the objective lens for endoscopes such that the value of (L5f−L6r)/(L5f+L6r) is not less than or equal to the lower limit defined in Conditional Formula (1). The generation of astigmatism can be suppressed, by configuring the objective lens for endoscopes such that the value of (L5f−L6r)/(L5f+L6r) is not greater than or equal to the upper limit defined in Conditional Formula (1). In addition, fluctuations in astigmatism and lateral chromatic aberrations due to focusing operations can be suppressed, which is advantageous from the viewpoint of widening the angle of view.

Note that it is preferable for Conditional Formula (1-1) below to be satisfied, in order to cause the advantageous effects related to Conditional Formula (1) to become more prominent.

$$0.4<(L5f-L6r)/(L5f+L6r)<0.7 \quad (1-1)$$

Further in this objective lens for endoscopes, it is preferable for any one or arbitrary combinations of Conditional Formulae (2) through (9) to be satisfied.

$$2<v1Cn-v1Cp<10 \quad (2)$$

$$25<v2Cp-v2Cn<60 \quad (3)$$

$$0.01<\theta gF1Cp-\theta gF1Cn<0.04 \quad (4)$$

$$0.04<\theta gF2Cn-\theta gF2Cp<0.09 \quad (5)$$

$$0.15<f/fC2<0.4 \quad (6)$$

$$0<f/fC1<0.3 \quad (7)$$

$$0.02<\theta hg2Cn-\theta hg2Cp<0.15 \quad (8)$$

$$0<\theta hg1Cp-\theta hg1Cn<0.07 \quad (9)$$

wherein v1Cp is the Abbe's number with respect to the d line of the positive lens within the first cemented lens, v1Cn is the Abbe's number with respect to the d line of the negative lens within the first cemented lens, v2Cp is the Abbe's number with respect to the d line of the positive lens within the second cemented lens, v2Cn is the Abbe's number with respect to the d line of the negative lens within the second cemented lens, θgF1Cp is the partial dispersion ratio between the g line and the F line of the positive lens within the first cemented lens, θgF1Cn is the partial dispersion ratio between the g line and the F line of the negative lens within the first cemented lens, θgF2Cp is the partial dispersion ratio between the g line and the F line of the positive lens within the second cemented lens, θgF2Cn is the partial dispersion ratio between the g line and the F line of the negative lens within the second cemented lens, θhg2Cp is the partial dispersion ratio between the h line and the g line of the positive lens within the second cemented lens, θhg2Cn is the partial dispersion ratio between the h line and the g line of the negative lens within the second cemented lens, θhg1Cp is the partial dispersion ratio between the h line and the g line of the positive lens within the first cemented lens, θhg1Cn is the partial dispersion ratio between the h line and the g line of the negative lens within the first cemented lens, f is the focal length of the entire lens system, fC1 is the focal length of the first cemented lens, and fC2 is the focal length of the second cemented lens.

Configuring the objective lens for endoscopes such that the value of v1Cn−v1Cp is not less than or equal to the lower limit defined in Conditional Formula (2) is advantageous from the viewpoint of correcting lateral chromatic aberration. The contribution of the second cemented lens CE2 with respect to correction of lateral chromatic aberration can be increased by configuring the objective lens for endoscope such that the value of v1Cn−v1Cp is not greater than or equal to the upper limit defined in Conditional Formula (2). As a result, the contribution of the first cemented lens CE1 with respect to correction of lateral chromatic aberration can be prevented from becoming excessive, which is advantageous from the viewpoint of the first cemented lens CE1 achieving a balance between lateral chromatic aberration and longitudinal chromatic aberration.

Lateral chromatic aberration being insufficiently corrected can be prevented, by configuring the objective lens for endoscopes such that the value of v2Cp−v2Cn is not less than or equal to the lower limit defined in Conditional Formula (3). Lateral chromatic aberration being excessively corrected can be prevented, by configuring the objective lens for endoscopes such that the value of v2Cp−v2Cn is not greater than or equal to the upper limit defined in Conditional Formula (3). Satisfying Conditional Formula (3) is advantageous from the viewpoint of correcting lateral chromatic aberration.

Second order lateral chromatic aberration being excessively corrected can be prevented, by configuring the objective lens for endoscopes such that the value of gF1Cp−θgF1Cn is not less than or equal to the lower limit defined in Conditional Formula (4). Second order lateral chromatic aberration being insufficiently corrected can be prevented, by configuring the objective lens for endoscopes such that the value of θgF1Cp−θgF1Cn is not greater than or equal to the upper limit defined in Conditional Formula (4). Satisfying Conditional Formula (4) is advantageous from the viewpoint of correcting second order lateral chromatic aberration.

Second order lateral chromatic aberration being excessively corrected can be prevented, by configuring the objective lens for endoscopes such that the value of θgF2Cn−θgF2Cp is not less than or equal to the lower limit defined in Conditional Formula (5). Second order lateral chromatic aberration being insufficiently corrected can be prevented, by configuring the objective lens for endoscopes such that the value of θgF2Cn−θgF2Cp is not greater than or equal to the upper limit defined in Conditional Formula (5). Satisfying Conditional Formula (5) is advantageous from the viewpoint of correcting second order lateral chromatic aberration.

The amount of movement of the second cemented lens CE2 during focusing operations can be suppressed, by configuring the objective lens for endoscopes such that the value of f/fC2 is not less than or equal to the lower limit defined in Conditional Formula (6). Fluctuations in astigmatism during focusing operations can be suppressed, by configuring the objective lens for endoscopes such that the value of f/fC2 is not greater than or equal to the upper limit defined in Conditional Formula (6).

Configuring the objective lens for endoscopes such that the value of f/fC1 is not less than or equal to the lower limit defined in Conditional Formula (7) is advantageous from the viewpoint of correcting distortion. Back focus can be favorably secured, by configuring the objective lens for endoscopes such that the value of f/fC1 is not greater than or equal to the upper limit defined in Conditional Formula (7).

Lateral chromatic aberration being excessively corrected in the near ultraviolet range can be prevented, by configuring the objective lens for endoscopes such that the value of θhg2Cn−θhg2Cp is not less than or equal to the lower limit defined in Conditional Formula (8). Lateral chromatic aberration being insufficiently corrected in the near ultraviolet range can be prevented, by configuring the objective lens for endoscopes such that the value of θhg2Cn−θhg2Cp is not greater than or equal to the upper limit defined in Conditional Formula (8).

Lateral chromatic aberration being excessively corrected in the near ultraviolet range can be prevented, by configuring the objective lens for endoscopes such that the value of θhg1Cp−θhg1Cn is not less than or equal to the lower limit defined in Conditional Formula (9). Lateral chromatic aberration being insufficiently corrected in the near ultraviolet range can be prevented, by configuring the objective lens for endoscopes such that the value of θhg1Cp−θhg1Cn is not greater than or equal to the upper limit defined in Conditional Formula (9)

Note that it is more preferable for Conditional Formulae (2-1) through (9-1) below to be satisfied instead of Conditional Formulae (2) through (9), in order to cause the advantageous effects related to Conditional Formulae (2) through (9) to become more prominent.

$$3 < v1Cn - v1Cp < 8 \quad (2\text{-}1)$$

$$30 < v2Cp - v2Cn < 50 \quad (3\text{-}1)$$

$$0.015 < \theta gF1Cp - gF1Cn < 0.035 \quad (4\text{-}1)$$

$$0.05 < \theta gF2Cn - \theta gF2Cp < 0.08 \quad (5\text{-}1)$$

$$0.2 \leq f/fC2 < 0.3 \quad (6\text{-}1)$$

$$0.05 \leq f/fC1 < 0.1 \quad (7\text{-}1)$$

$$0.06 < \theta hg2Cn - \theta hg2Cp < 0.12 \quad (8\text{-}1)$$

$$0.02 < \theta hg1Cp - \theta hg1Cn < 0.06 \quad (9\text{-}1)$$

It is preferable for the preferred configurations above, including the configurations related to the conditional formulae, to be selectively adopted as appropriate, according to specifications required of the objective lens for endoscopes. The present embodiment may be applied as a wide angle objective lens for endoscopes. Specifically, the present embodiment may be applied as an objective lens for endoscopes having a full angle of view of 120° or greater, and preferably 130° or greater, for example.

Next, specific examples of numerical values of the objective lens for endoscopes of the present disclosure will be described. Examples 1 through 6 to be described hereunder are those in which the object distance at a most distant point focus state is 12 mm, and the object distance at a most proximal point focus state is 3 mm. Note that the object distance is the distance along the optical axis from an object to the lens surface most toward the object side.

Example 1

The lens configuration of and the paths of light beams through the objective lens for endoscopes of Example 1 are illustrated in FIG. 1. The manner in which the objective lens for endoscopes is illustrated has been described above, and redundant descriptions will be omitted here. Table 1 shows basic lens data of the objective lens for endoscopes of Example 1. In the lens data of Table 1, surface numbers i (i=1, 2, 3, . . . ) that sequentially increase toward the image side with the surface of the constituent element most toward the object side being designated as 1 are listed in column Si; the radii of curvature of $i^{th}$ surfaces are listed in column Ri; and distances along the optical axis Z between an $i^{th}$ surface and an $i+1^{st}$ surface are listed in column Di. In addition, refractive indices with respect to the d line (wavelength: 587.6 nm) of optical elements j (j=1, 2, 3, . . . ) that sequentially increase toward the image side with the optical element most toward the object side being designated as 1 are listed in column Ndj; and the Abbe's numbers with respect to the d line of $j^{th}$ optical elements are listed in column vdj. The partial dispersion ratio between the g line and the F line of $j^{th}$ optical elements are shown in the column θgFj, and the partial dispersion ratio between the h line and the g line of $j^{th}$ optical elements are shown in the column θhgj. However, θgFj and θhgj are only shown for lenses that constitute cemented lenses.

The signs of the radii of curvature are positive in cases that the shapes of the surfaces are convex toward the object side, and negative in cases that the shapes of the surfaces are convex toward the object side. The value in the lowermost row of the column that shows distances between surfaces indicates the distance between the surface most toward the image side in the table and the imaging surface. The basic lens data also include data regarding the aperture stop St and the optical member PP. The word (stop) is indicated along with the surface number in the row corresponding to the aperture stop St of the column that shows surface numbers. In addition, DD [ ] is indicated in the rows corresponding to surface distances that change during focusing operations, and the surface number of the surface toward the object side that forms the surface distance is inserted between the brackets in column Di.

Table 2 shows items related to the d line and the values of variable distances in the most distant point focus state and the most proximal point focus state for the objective lens for endoscopes of Example 1. The items shown in Table 2 are: the focal length f of the entire lens system, the back focus Bf of the entire lens system, the F number F No., and the full angle of view 2ω (in units of degrees).

In the tables below, degrees are employed as the unit of angles, and mm is employed as the unit of length. However, because optical systems may be proportionately enlarged or reduced and utilized, other appropriate units may be employed. In addition, the tables below show numerical values which are rounded off at a predetermined number of digits.

TABLE 1

Example 1

| Si | Ri | Di | Ndj | vdj | θgFj | θhgj |
|---|---|---|---|---|---|---|
| 1 | 7.135 | 0.350 | 1.88300 | 40.81 | | |
| 2 | 0.892 | 0.400 | | | | |
| 3 | ∞ | 0.880 | 1.76182 | 26.52 | 0.6136 | 0.5539 |
| 4 | 2.128 | 1.670 | 1.89286 | 20.36 | 0.6394 | 0.5964 |
| 5 | ∞ | 0.000 | | | | |
| 6 (St) | ∞ | 0.035 | | | | |
| 7 | ∞ | 0.730 | 1.69680 | 55.53 | | |
| 8 | −1.661 | DD [8] | | | | |
| 9 | −6.254 | 0.940 | 1.59522 | 67.73 | 0.5443 | 0.4505 |
| 10 | −1.022 | 0.430 | 1.76182 | 26.52 | 0.6136 | 0.5539 |
| 11 | −1.818 | DD [11] | | | | |
| 12 | ∞ | 3.500 | 1.55920 | 53.92 | | |
| 13 | ∞ | 0.000 | | | | |

TABLE 2

Example 1

| | Most Distant Point Focus State Object Distance = 12 mm | Most Proximal Point Focus State Object Distance = 3 mm |
|---|---|---|
| f | 1.264 | 1.217 |
| Bf | 2.989 | 3.086 |
| F No. | 8.22 | 8.25 |
| 2ω [°] | 135.2 | 134.6 |
| DD [8] | 0.755 | 0.380 |
| DD [11] | 0.870 | 1.236 |

Spherical aberration diagrams, astigmatism diagrams, distortion diagrams, and lateral chromatic aberration diagrams of the imaging lens of Example 1 are illustrated in this order from the left side of the drawing sheet in FIG. 7. The upper portion of FIG. 7 illustrates aberration diagrams in a most distant point focus state, and the lower portion of FIG. 7 illustrates aberration diagrams in a most proximal point focus state. The spherical aberration diagrams show aberrations related to the d line, the C line, the g line, and the h line as a black solid line, a long broken line, a gray solid line, and a short broken line, respectively. In the astigmatism diagrams, aberrations in the sagittal direction are indicated by solid lines, while aberrations in the tangential direction are indicated by short broken lines. In the distortion diagrams, aberrations related to the d line are shown as solid lines. In the lateral chromatic diagrams, aberrations related to the C line, the g line, and the h line are shown as a long broken line, a gray solid line, and a short broken line, respectively. In the diagrams that illustrate spherical aberration, "FNo." denotes F numbers. In the other diagrams that illustrate the aberrations, ω denotes half angles of view.

The symbols, the meanings, and the manner in which the data are shown in the diagrams related to Example 1 above are the same for the following Examples to be described later, unless particularly noted. Therefore, redundant descriptions will be omitted hereinbelow.

Example 2

Figure 8:
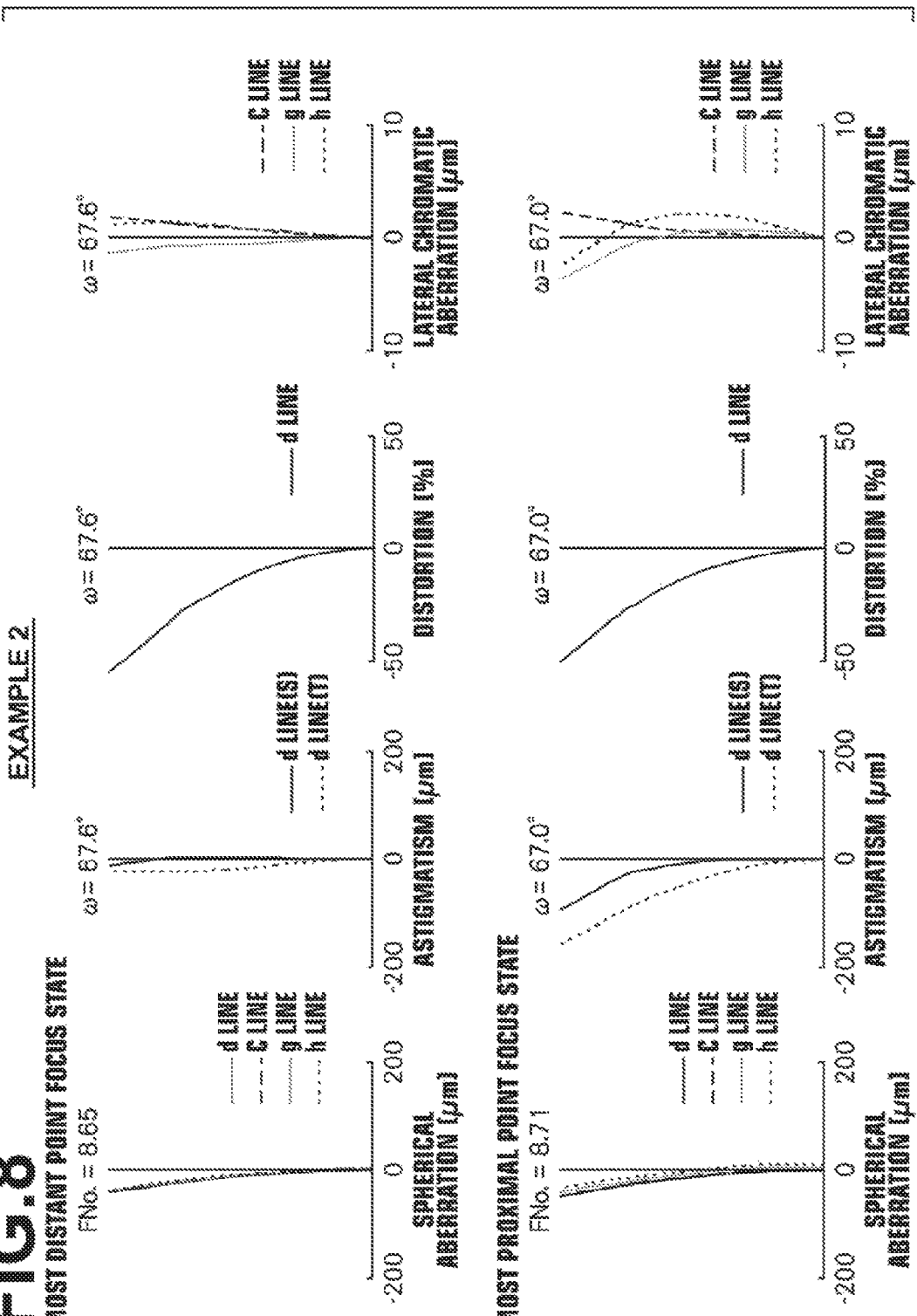
FIG. 8 is a collection of diagrams that illustrate various aberrations of the objective lens for endoscopes of Example 2, which are spherical aberration, astigmatism, distortion, and lateral chromatic aberration in this order from the left side of the drawing sheet.

The lens configuration of and the paths of light beams that pass through the objective lens for endoscopes of Example 2 are illustrated in FIG. 2. Basic lens data of the objective lens for endoscopes of Example 2 are shown in Table 3, and the values of items and variable distances of the objective lens for endoscopes of Example 2 are shown in Table 4. Aberration diagrams of the objective lens for endoscopes of Example 2 are illustrated in FIG. 8.

TABLE 3

Example 2

| Si | Ri | Di | Ndj | vdj | θgFj | θhgj |
|---|---|---|---|---|---|---|
| 1 | 7.135 | 0.350 | 1.88300 | 40.81 | | |
| 2 | 0.892 | 0.390 | | | | |
| 3 | 27.402 | 0.890 | 1.84666 | 23.78 | 0.6205 | 0.5645 |
| 4 | 1.818 | 1.700 | 1.89286 | 20.36 | 0.6394 | 0.5964 |
| 5 | ∞ | 0.000 | | | | |
| 6 (St) | ∞ | 0.035 | | | | |
| 7 | ∞ | 0.730 | 1.69680 | 55.53 | | |
| 8 | −1.661 | DD [8] | | | | |
| 9 | −6.085 | 0.940 | 1.59522 | 67.73 | 0.5443 | 0.4505 |
| 10 | −1.022 | 0.350 | 1.72825 | 28.46 | 0.6077 | 0.5447 |
| 11 | −1.818 | DD [11] | | | | |
| 12 | ∞ | 3.500 | 1.55920 | 53.92 | | |
| 13 | ∞ | 0.000 | | | | |

TABLE 4

Example 2

| | Most Distant Point Focus State Object Distance = 12 mm | Most Proximal Point Focus State Object Distance = 3 mm |
|---|---|---|
| f | 1.264 | 1.221 |
| Bf | 2.985 | 3.066 |
| F No. | 8.65 | 8.71 |
| 2ω [°] | 135.2 | 134.0 |
| DD [8] | 0.811 | 0.457 |
| DD [11] | 0.866 | 1.219 |

Example 3

Figure 9:
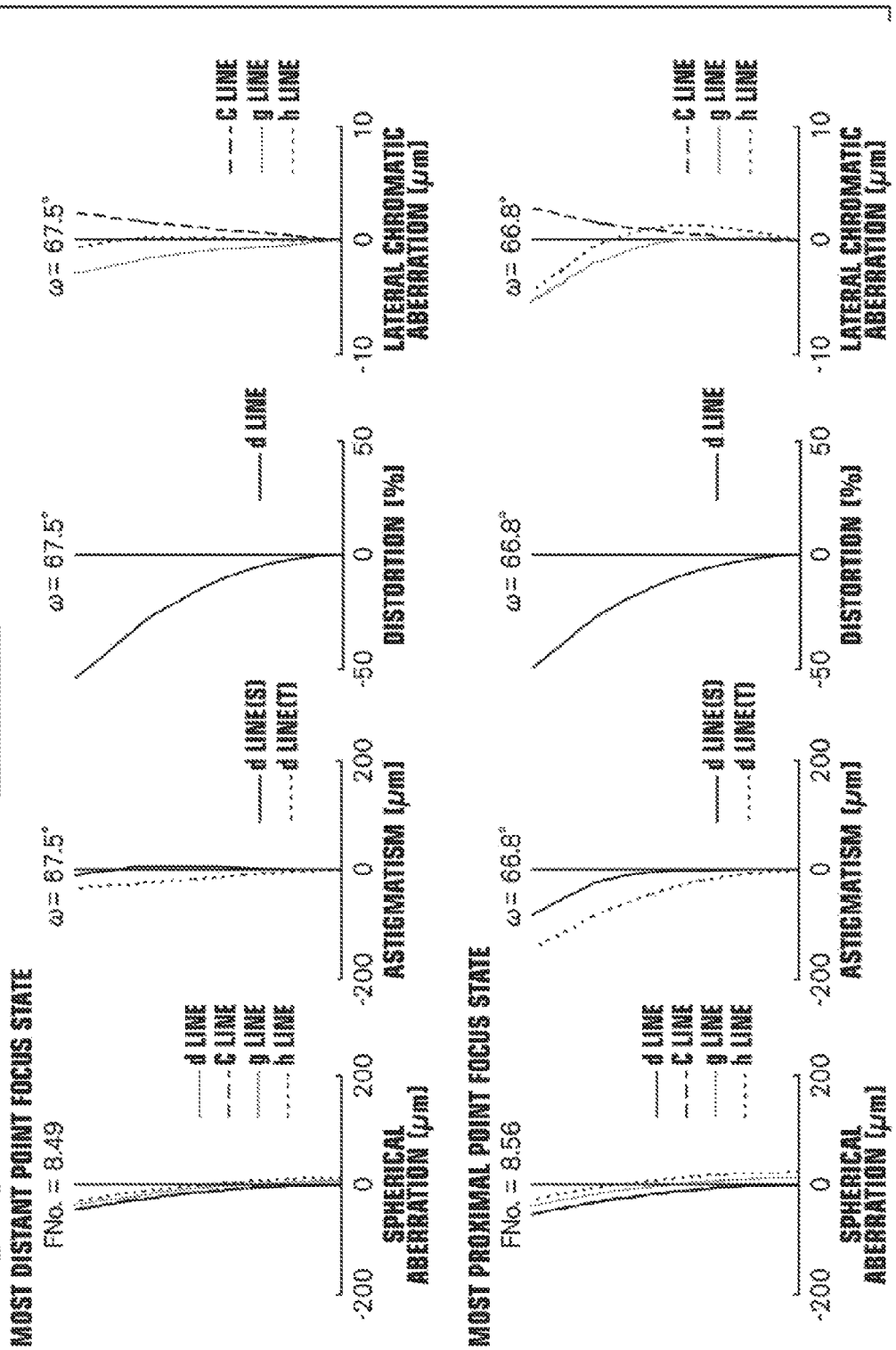
FIG. 9 is a collection of diagrams that illustrate various aberrations of the objective lens for endoscopes of Example 3, which are spherical aberration, astigmatism, distortion, and lateral chromatic aberration in this order from the left side of the drawing sheet.

The lens configuration of and the paths of light beams that pass through the objective lens for endoscopes of Example 3 are illustrated in FIG. 3. Basic lens data of the objective lens for endoscopes of Example 3 are shown in Table 5, and the values of items and variable distances of the objective lens for endoscopes of Example 3 are shown in Table 6. Aberration diagrams of the objective lens for endoscopes of Example 3 are illustrated in FIG. 9.

TABLE 5

Example 3

| Si | Ri | Di | Ndj | vdj | θgFj | θhgj |
|---|---|---|---|---|---|---|
| 1 | 7.135 | 0.350 | 1.88300 | 40.81 | | |
| 2 | 0.892 | 0.389 | | | | |
| 3 | 25.201 | 1.000 | 1.84666 | 23.78 | 0.6205 | 0.5645 |
| 4 | 1.818 | 1.570 | 1.89286 | 20.36 | 0.6394 | 0.5964 |
| 5 | ∞ | 0.000 | | | | |

TABLE 5-continued

Example 3

| Si | Ri | Di | Ndj | vdj | θgFj | θhgj |
|---|---|---|---|---|---|---|
| 6 (St) | ∞ | 0.035 | | | | |
| 7 | ∞ | 0.730 | 1.69680 | 55.53 | | |
| 8 | −1.661 | DD [8] | | | | |
| 9 | −5.002 | 0.940 | 1.62041 | 60.29 | 0.5427 | 0.4500 |
| 10 | −1.022 | 0.360 | 1.80518 | 25.42 | 0.6162 | 0.5573 |
| 11 | −1.742 | DD [11] | | | | |
| 12 | ∞ | 3.500 | 1.55920 | 53.92 | | |
| 13 | ∞ | 0.000 | | | | |

TABLE 6

Example 3

| | Most Distant Point Focus State Object Distance = 12 mm | Most Proximal Point Focus State Object Distance = 3 mm |
|---|---|---|
| f | 1.266 | 1.222 |
| Bf | 3.138 | 3.219 |
| F No. | 8.49 | 8.56 |
| 2ω [°] | 135.0 | 133.6 |
| DD [8] | 0.680 | 0.326 |
| DD [11] | 1.019 | 1.373 |

Example 4

Figure 10:
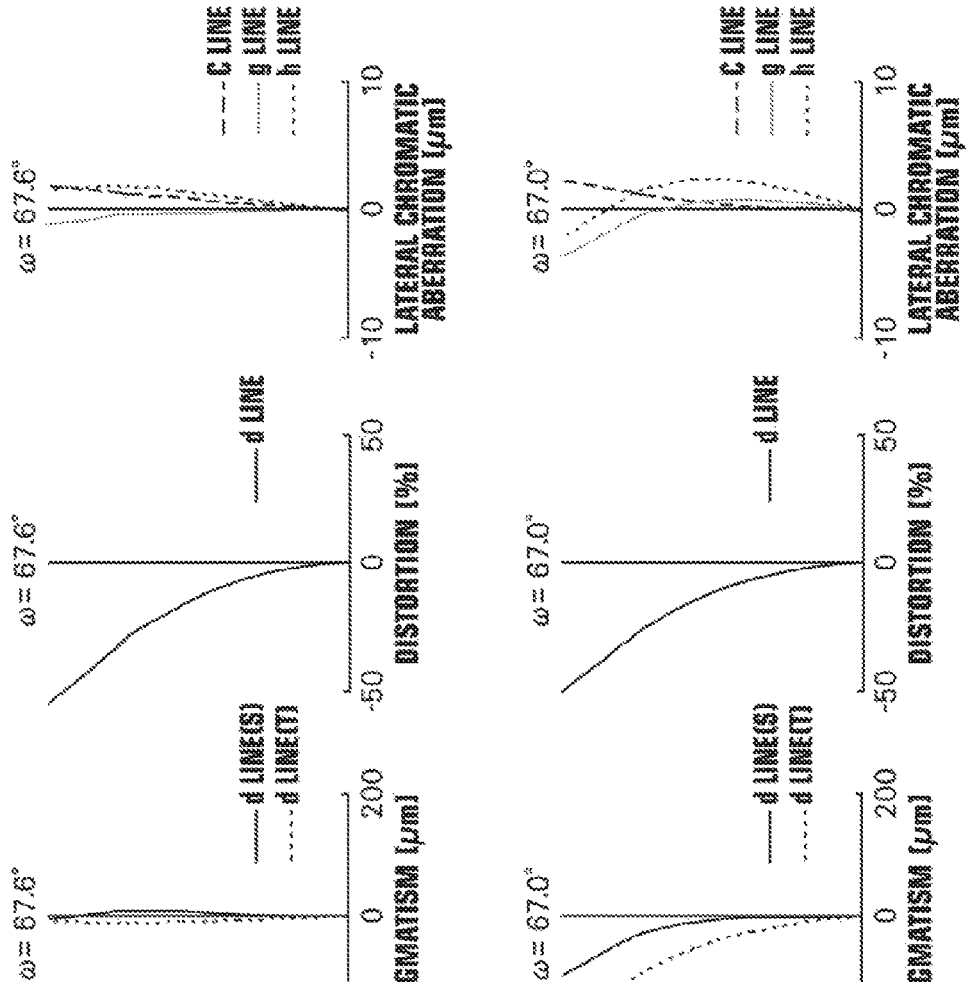
FIG. 10 is a collection of diagrams that illustrate various aberrations of the objective lens for endoscopes of Example 4, which are spherical aberration, astigmatism, distortion, and lateral chromatic aberration in this order from the left side of the drawing sheet.

The lens configuration of and the paths of light beams that pass through the objective lens for endoscopes of Example 4 are illustrated in FIG. 4. Basic lens data of the objective lens for endoscopes of Example 4 are shown in Table 7, and the values of items and variable distances of the objective lens for endoscopes of Example 4 are shown in Table 8. Aberration diagrams of the objective lens for endoscopes of Example 4 are illustrated in FIG. 10.

TABLE 7

Example 4

| Si | Ri | Di | Ndj | vdj | θgFj | θhgj |
|---|---|---|---|---|---|---|
| 1 | 7.135 | 0.350 | 1.88300 | 40.81 | | |
| 2 | 0.892 | 0.393 | | | | |
| 3 | 36.637 | 0.860 | 1.84666 | 23.78 | 0.6205 | 0.5645 |
| 4 | 1.426 | 1.700 | 1.89286 | 20.36 | 0.6394 | 0.5964 |
| 5 | ∞ | 0.000 | | | | |
| 6 (St) | ∞ | 0.035 | | | | |
| 7 | ∞ | 0.730 | 1.69680 | 55.53 | | |
| 8 | −1.661 | DD [8] | | | | |
| 9 | −7.632 | 0.940 | 1.59522 | 67.73 | 0.5443 | 0.4505 |
| 10 | −1.022 | 0.450 | 1.72825 | 28.46 | 0.6077 | 0.5447 |
| 11 | −1.901 | DD [11] | | | | |
| 12 | ∞ | 3.500 | 1.55920 | 53.92 | | |
| 13 | ∞ | 0.000 | | | | |

TABLE 8

Example 4

| | Most Distant Point Focus State Object Distance = 12 mm | Most Proximal Point Focus State Object Distance = 3 mm |
|---|---|---|
| f | 1.265 | 1.221 |
| Bf | 2.969 | 3.049 |
| F No. | 8.51 | 8.58 |
| 2ω [°] | 135.2 | 134.0 |

TABLE 8-continued

Example 4

| | Most Distant Point Focus State Object Distance = 12 mm | Most Proximal Point Focus State Object Distance = 3 mm |
|---|---|---|
| DD [8] | 0.753 | 0.397 |
| DD [11] | 0.850 | 1.205 |

Example 5

Figure 11:
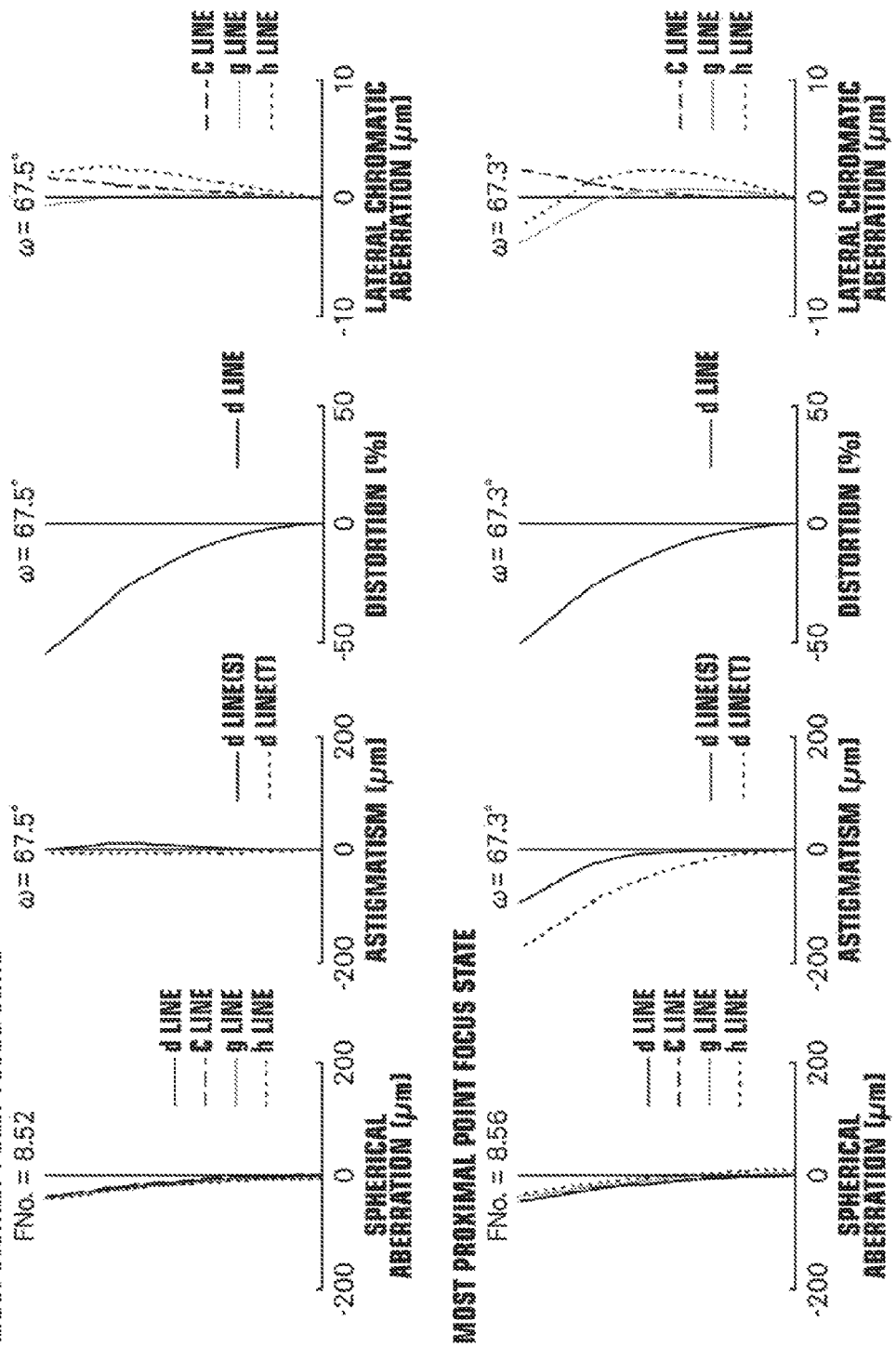
FIG. 11 is a collection of diagrams that illustrate various aberrations of the objective lens for endoscopes of Example 5, which are spherical aberration, astigmatism, distortion, and lateral chromatic aberration in this order from the left side of the drawing sheet.

The lens configuration of and the paths of light beams that pass through the objective lens for endoscopes of Example 5 are illustrated in FIG. 5. Basic lens data of the objective lens for endoscopes of Example 5 are shown in Table 9, and the values of items and variable distances of the objective lens for endoscopes of Example 5 are shown in Table 10. Aberration diagrams of the objective lens for endoscopes of Example 5 are illustrated in FIG. 11.

TABLE 9

Example 5

| Si | Ri | Di | Ndj | vdj | θgFj | θhgj |
|---|---|---|---|---|---|---|
| 1 | 7.135 | 0.350 | 1.88300 | 40.81 | | |
| 2 | 0.892 | 0.400 | | | | |
| 3 | ∞ | 0.880 | 1.75520 | 27.51 | 0.6103 | 0.5484 |
| 4 | 2.044 | 1.650 | 1.89286 | 20.36 | 0.6394 | 0.5964 |
| 5 | ∞ | 0.000 | | | | |
| 6 (St) | ∞ | 0.035 | | | | |
| 7 | ∞ | 0.730 | 1.69680 | 55.53 | | |
| 8 | −1.661 | DD [8] | | | | |
| 9 | −7.298 | 0.940 | 1.59522 | 67.73 | 0.5443 | 0.4505 |
| 10 | −1.022 | 0.500 | 1.80518 | 25.42 | 0.6162 | 0.5573 |
| 11 | −1.818 | DD [11] | | | | |
| 12 | ∞ | 3.500 | 1.55920 | 53.92 | | |
| 13 | ∞ | 0.000 | | | | |

TABLE 10

Example 5

| | Most Distant Point Focus State Object Distance = 12 mm | Most Proximal Point Focus State Object Distance = 3 mm |
|---|---|---|
| f | 1.266 | 1.218 |
| Bf | 3.002 | 3.098 |
| F No. | 8.52 | 8.56 |
| 2ω [°] | 135.0 | 134.6 |
| DD [8] | 0.692 | 0.323 |
| DD [11] | 0.883 | 1.252 |

Example 6

Figure 12:
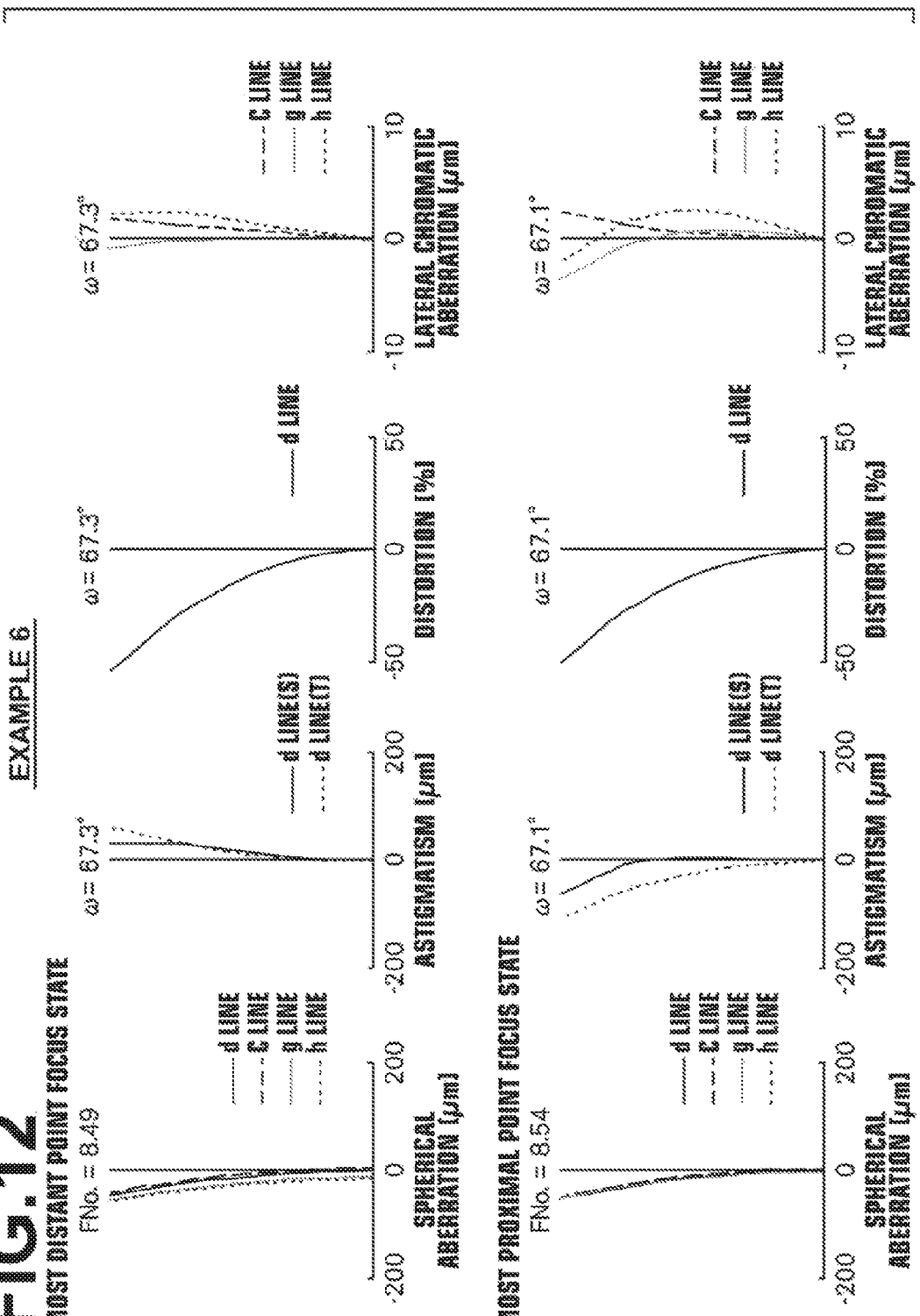
FIG. 12 is a collection of diagrams that illustrate various aberrations of the objective lens for endoscopes of Example 6, which are spherical aberration, astigmatism, distortion, and lateral chromatic aberration in this order from the left side of the drawing sheet.

The lens configuration of and the paths of light beams that pass through the objective lens for endoscopes of Example 6 are illustrated in FIG. 6. Basic lens data of the objective lens for endoscopes of Example 6 are shown in Table 11, and the values of items and variable distances of the objective lens for endoscopes of Example 6 are shown in Table 12. Aberration diagrams of the objective lens for endoscopes of Example 6 are illustrated in FIG. 12.

TABLE 11

Example 6

| Si | Ri | Di | Ndj | νdj | θgFj | θhgj |
|---|---|---|---|---|---|---|
| 1 | 7.135 | 0.350 | 1.88300 | 40.81 | | |
| 2 | 0.892 | 0.387 | | | | |
| 3 | 67.990 | 1.800 | 1.89286 | 20.36 | 0.6394 | 0.5964 |
| 4 | −1.991 | 0.866 | 1.80518 | 25.42 | 0.6162 | 0.5573 |
| 5 | ∞ | 0.000 | | | | |
| 6 (St) | ∞ | 0.035 | | | | |
| 7 | ∞ | 0.730 | 1.69680 | 55.53 | | |
| 8 | −1.661 | DD [8] | | | | |
| 9 | −5.002 | 0.940 | 1.62041 | 60.29 | 0.5427 | 0.4500 |
| 10 | −1.022 | 0.300 | 1.78472 | 25.68 | 0.6162 | 0.5577 |
| 11 | −1.818 | DD [11] | | | | |
| 12 | ∞ | 3.500 | 1.55920 | 53.92 | | |
| 13 | ∞ | 0.000 | | | | |

TABLE 12

Example 6

| | Most Distant Point Focus State Object Distance = 12 mm | Most Proximal Point Focus State Object Distance = 3 mm |
|---|---|---|
| f | 1.258 | 1.211 |
| Bf | 3.071 | 3.180 |
| F No. | 8.49 | 8.54 |
| 2ω [°] | 134.6 | 134.2 |
| DD [8] | 0.718 | 0.339 |
| DD [11] | 0.951 | 1.330 |

Table 13 shows the values of the focal length f of the entire lens system and values corresponding to Conditional Formulae (1) through (9) for Examples 1 through 6. The data shown in Table 13 are related to the d line.

TABLE 13

| Formula | | Example 1 | Example 2 | Example 3 | Example 4 | Example 5 | Example 6 |
|---|---|---|---|---|---|---|---|
| | f | 1.264 | 1.264 | 1.266 | 1.265 | 1.266 | 1.258 |
| (1) | (L5f − L6r)/(L5f + L6r) | 0.550 | 0.540 | 0.483 | 0.601 | 0.601 | 0.467 |
| (2) | ν1Cn − ν1Cp | 6.16 | 3.42 | 3.42 | 3.42 | 7.15 | 5.06 |
| (3) | ν2Cp − ν2Cn | 41.22 | 39.27 | 34.86 | 39.27 | 42.31 | 34.61 |
| (4) | θgF1Cp − θgF1Cn | 0.0258 | 0.0189 | 0.0189 | 0.0189 | 0.0291 | 0.0233 |
| (5) | θgF2Cn − θgF2Cp | 0.0694 | 0.0635 | 0.0735 | 0.0635 | 0.0719 | 0.0735 |
| (6) | f/fC2 | 0.256 | 0.262 | 0.262 | 0.263 | 0.258 | 0.236 |
| (7) | f/fC1 | 0.078 | 0.071 | 0.074 | 0.070 | 0.085 | 0.071 |
| (8) | θhg2Cn − θhg2Cp | 0.1034 | 0.0942 | 0.1073 | 0.0942 | 0.1068 | 0.1077 |
| (9) | θhg1Cp − θhg1Cn | 0.0425 | 0.0319 | 0.0319 | 0.0319 | 0.048 | 0.0391 |

Figure 13:
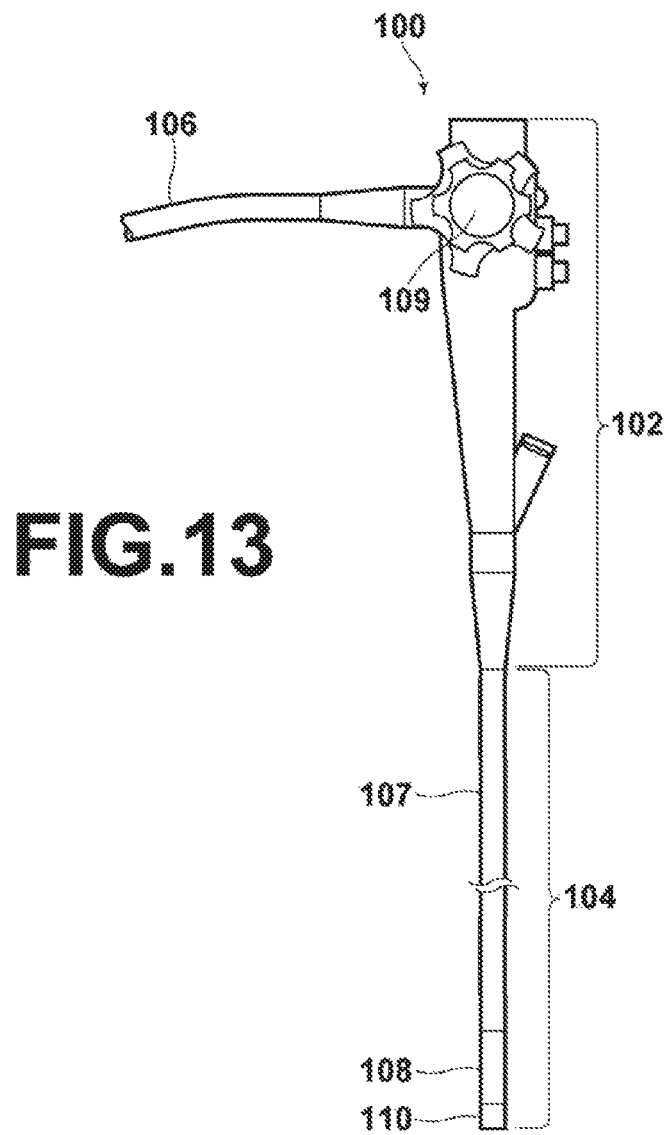
FIG. 13 is a diagram that illustrates the schematic structure of an endoscope according to an embodiment of the present disclosure.

Next, an embodiment of an endoscope to which the objective lens for endoscopes of the present disclosure is applied will be described with reference to FIG. 13 and FIG. 14. FIG. 13 illustrates the schematic structure of the entire endoscope. The endoscope 100 illustrated in FIG. 13 is mainly equipped with an operating portion 102, an insertion portion 104, and a universal cord 106 to be connected to a connector portion (not shown). The majority of the insertion portion 104 is a flexible portion 107 which can be bent in desired directions along an insertion path. A bendable portion 108 is linked to the leading end of the flexible portion 107, and a leading end portion 110 is linked to the leading end of the bendable portion 108. The bendable portion 108 is provided to orient the leading end portion 110 in desired directions. Bending operations are enabled by rotating a bending operation knob 109 provided on the operating portion 102.

Figure 14:
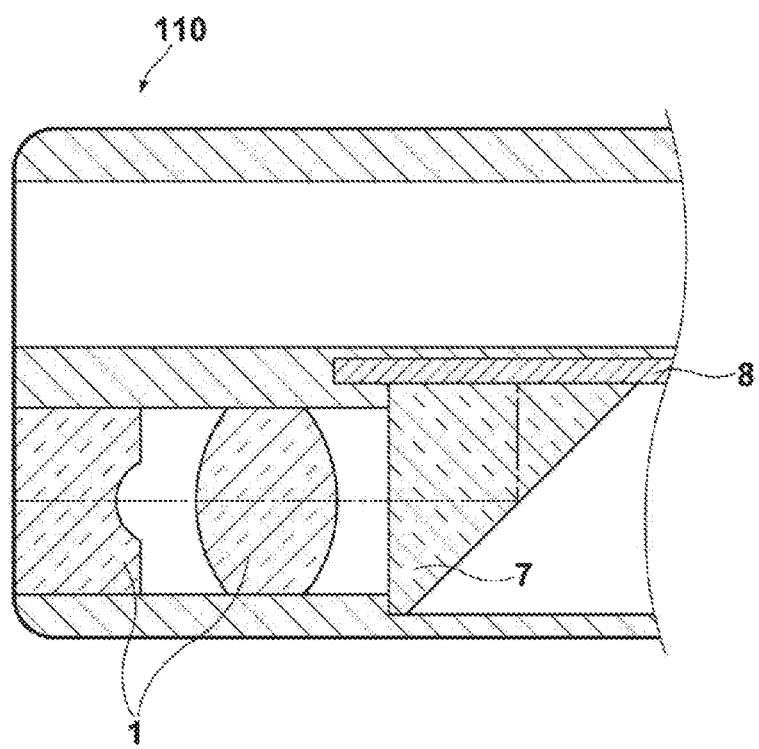
FIG. 14 is a cross sectional diagram of the main parts of a leading end portion of the endoscope according to the embodiment of the present disclosure.

FIG. 14 is a cross sectional diagram of the main portions of the leading end portion 110. An objective lens for endoscopes 1, which is arranged such that the optical axis thereof is parallel to the longitudinal direction of the insertion portion 104, an optical path converting prism 7 for bending the optical path at the image side of the objective lens for endoscopes 1 approximately 90 degrees, and a solid state imaging element 8, which is coupled to the optical path converting prism 7 such that a light receiving surface thereof is parallel to the longitudinal direction of the insertion portion 104, are provided within the interior of the leading end portion 110. Note that the objective lens for endoscopes 1 is conceptually illustrated in FIG. 14, and the optical axis of an observation optical system formed by the objective lens for endoscopes 1 is illustrated as a dotted chain line. Optical images which are formed by the objective lens for endoscopes 1 are captured by the solid state imaging element 8, and converted into electrical signals.

The present disclosure has been described with reference to the embodiments and Examples. However, the present disclosure is not limited to the above embodiments and Examples, and various modifications are possible. For example, the numerical values of the radii of curvature, the surface distances, the refractive indices, the Abbe's numbers, etc. of the lens components are not limited to those exemplified in the above Examples, and may be different values.

What is claimed is:

1. An objective lens for endoscopes, consisting of, in order from the object side to the image side:
   a first lens having a negative refractive power and a concave surface toward the image side;
   a first cemented lens, formed by cementing a second lens and a third lens having refractive powers with signs opposite each other, provided in this order from the object side to the image side, together;
   a stop;
   a fourth lens having a positive refractive power and a convex surface toward the image side; and
   a second cemented lens, formed by cementing a fifth lens having a positive refractive power and a sixth lens having a negative refractive power, provided in this order from the object side to the image side, together, in which the coupling surface between the fifth lens and the sixth lens is convex toward the image side;
   focusing operations to change focus from an object at a most distant point to an object at a most proximal point being performed by moving only the second cemented lens; and
   Conditional Formula (1) below being satisfied:

$$0.3 < (L5f - L6r)/(L5f + L6r) < 0.8 \quad (1)$$

wherein L5f is the radius of curvature of the surface of the fifth lens toward the object side, and L6r is the radius of curvature of the surface of the sixth lens toward the image side.

2. An objective lens for endoscopes as defined in claim 1, in which Conditional Formula (2) below is satisfied:

$$2 < \nu Cn - \nu 1Cp < 10 \qquad (2)$$

wherein $\nu 1Cp$ is the Abbe's number with respect to the d line of the positive lens within the first cemented lens, and $\nu 1Cn$ is the Abbe's number with respect to the d line of the negative lens within the first cemented lens.

3. An objective lens for endoscopes as defined in claim 1, in which Conditional Formula (3) below is satisfied:

$$25 < \nu 2Cp - \nu 2Cn < 60 \qquad (3)$$

wherein $\nu 2Cp$ is the Abbe's number with respect to the d line of the positive lens within the second cemented lens, and $\nu 2Cn$ is the Abbe's number with respect to the d line of the negative lens within the second cemented lens.

4. An objective lens for endoscopes as defined in claim 1, in which Conditional Formula (4) below is satisfied:

$$0.01 < \theta gF1Cp - \theta gF1Cn < 0.04 \qquad (4)$$

wherein $\theta gF1Cp$ is the partial dispersion ratio between the g line and the F line of the positive lens within the first cemented lens, and $\theta gF1Cn$ is the partial dispersion ratio between the g line and the F line of the negative lens within the first cemented lens.

5. An objective lens for endoscopes as defined in claim 1, in which Conditional Formula (5) below is satisfied:

$$0.04 < \theta gF2Cn - \theta gF2Cp < 0.09 \qquad (5)$$

wherein $\theta gF2Cp$ is the partial dispersion ratio between the g line and the F line of the positive lens within the second cemented lens, and $\theta gF2Cn$ is the partial dispersion ratio between the g line and the F line of the negative lens within the second cemented lens.

6. An objective lens for endoscopes as defined in claim 1, in which Conditional Formula (6) below is satisfied:

$$0.15 < f/fC2 < 0.4 \qquad (6)$$

wherein f is the focal length of the entire lens system, and fC2 is the focal length of the second cemented lens.

7. An objective lens for endoscopes as defined in claim 1, in which Conditional Formula (7) below is satisfied:

$$0 < f/fC1 < 0.3 \qquad (7)$$

wherein f is the focal length of the entire lens system, and fC1 is the focal length of the first cemented lens.

8. An objective lens for endoscopes as defined in claim 1, in which Conditional Formula (8) below is satisfied:

$$0.02 < \theta hg2Cn - \theta hg2Cp < 0.15 \qquad (8)$$

wherein $\theta hg2Cn$ is the partial dispersion ratio between the h line and the g line of the negative lens within the second cemented lens, and $\theta hg2Cp$ is the partial dispersion ratio between the h line and the g line of the positive lens within the second cemented lens.

9. An objective lens for endoscopes as defined in claim 1, in which Conditional Formula (9) below is satisfied:

$$0 < \theta hg1Cp - \theta hg1Cn < 0.07 \qquad (9)$$

wherein $\theta hg1Cp$ is the partial dispersion ratio between the h line and the g line of the positive lens within the first cemented lens, and $\theta hg1Cn$ is the partial dispersion ratio between the h line and the g line of the negative lens within the first cemented lens.

10. An objective lens for endoscopes as defined in claim 1, wherein:
the first cemented lens is formed by cementing a second lens having a negative refractive power and a third lens having a positive refractive power, provided in this order from the object side to the image side, together, and
the coupling surface between the second lens and the third lens is convex toward the object side.

11. An objective lens for endoscopes as defined in claim 1, wherein:
the first cemented lens is formed by cementing a second lens having a positive refractive power and a third lens having a negative refractive power, provided in this order from the object side to the image side, together, and
the coupling surface between the second lens and the third lens is convex toward the image side.

12. An objective lens for endoscopes as defined in claim 1, in which Conditional Formula (1-1) below is satisfied:

$$0.4 < (L5f - L6r)/(L5f + L6r) < 0.7 \qquad (1\text{-}1).$$

13. An objective lens for endoscopes as defined in claim 2, in which Conditional Formula (2-1) below is satisfied:

$$3 < \nu 1Cn - \nu 1Cp < 8 \qquad (2\text{-}1).$$

14. An objective lens for endoscopes as defined in claim 3, in which Conditional Formula (3-1) below is satisfied:

$$30 < \nu 2Cp - \nu 2Cn < 50 \qquad (3\text{-}1).$$

15. An objective lens for endoscopes as defined in claim 4, in which Conditional Formula (4-1) below is satisfied:

$$0.015 < \theta gF1Cp - \theta gF1Cn < 0.035 \qquad (4\text{-}1).$$

16. An objective lens for endoscopes as defined in claim 5, in which Conditional Formula (5-1) below is satisfied:

$$0.05 < \theta gF2Cn - \theta gF2Cp < 0.08 \qquad (5\text{-}1).$$

17. An objective lens for endoscopes as defined in claim 7, in which Conditional Formula (7-1) below is satisfied:

$$0.05 < f/fC1 < 0.1 \qquad (7\text{-}1).$$

18. An objective lens for endoscopes as defined in claim 8, in which Conditional Formula (8-1) below is satisfied:

$$0.06 < \theta hg2Cn - \theta hg2Cp < 0.12 \qquad (8\text{-}1).$$

19. An objective lens for endoscopes as defined in claim 9, in which Conditional Formula (9-1) below is satisfied:

$$0.02 < \theta hg1Cp - \theta hg1Cn < 0.06 \qquad (9\text{-}1).$$

20. An endoscope equipped with an objective lens for endoscopes as defined in claim 1.

* * * * *